United States Patent
Lee

(10) Patent No.: US 8,904,072 B2
(45) Date of Patent: Dec. 2, 2014

(54) STORAGE DEVICE TO EXTEND FUNCTIONS DYNAMICALLY AND OPERATING METHOD THEREOF

(75) Inventor: Jaesoo Lee, Hwaseong-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 334 days.

(21) Appl. No.: 13/332,764

(22) Filed: Dec. 21, 2011

(65) Prior Publication Data

US 2012/0166689 A1   Jun. 28, 2012

(30) Foreign Application Priority Data

Dec. 22, 2010 (KR) .......................... 10-2010-0132645

(51) Int. Cl.
| | | |
|---|---|---|
| G06F 3/00 | (2006.01) | |
| G06F 13/12 | (2006.01) | |
| H04L 29/06 | (2006.01) | |
| H04L 29/08 | (2006.01) | |
| G06F 3/06 | (2006.01) | |
| H04L 12/24 | (2006.01) | |
| H04L 12/26 | (2006.01) | |

(52) U.S. Cl.
CPC ................ *G06F 3/067* (2013.01); *H04L 69/08* (2013.01); *H04L 67/1097* (2013.01); *H04L 41/0672* (2013.01); *H04L 41/0893* (2013.01); *G06F 3/0632* (2013.01); *H04L 67/16* (2013.01); *G06F 3/0685* (2013.01); *H04L 43/0817* (2013.01); *G06F 3/0607* (2013.01); *H04L 43/0811* (2013.01)
USPC .................................... 710/74; 710/8; 710/19

(58) Field of Classification Search
None
See application file for complete search history.

(56) References Cited

U.S. PATENT DOCUMENTS

2007/0255768 A1    11/2007  Shitomi et al.
2010/0002636 A1*    1/2010  Petersen et al. ............... 370/329

FOREIGN PATENT DOCUMENTS

| JP | 2009-163516 | 7/2009 |
|---|---|---|
| KR | 10-2006-0070283 | 6/2006 |
| KR | 10-2009-0003093 | 1/2009 |

OTHER PUBLICATIONS

A.T. Chan et al, "Enabling Distributed Corba Access to Smart Card Applications," IEEE Internet Computing, vol. 6, 2002, pp. 27-36.
T13 Technical Editor, "AT Attachment with Packet Interface-7, vol. 1—Register Dilivered Command Set, Logical Register Set (ATA/ATAPI-7 V1)," ANSI INCITS, Apr. 2004.
"Serial ATA Revision 2.6 specification (final)," Serial ATA International Organization, Feb. 2007.
"Serial ATA Revision 3.0—Gold Revision," Serial ATA International Organization, May 2009.
T10 Technical Editor, "SCSI Primary Commands-3 (SPC-3) Rev. 23," ISO/IEC 14776-313, ANSI INCITS, May 2005.

(Continued)

*Primary Examiner* — Zachary K Huson
(74) *Attorney, Agent, or Firm* — Ellsworth IP Group PLLC

(57) ABSTRACT

A storage system includes a first device having a device manager, and a storage device to generate a domain with the first device. The storage device further includes a domain manager that sends a domain manager message to the first device in response to a discovery message transferred from the device manager. The device manager may register the first device in the domain based on a registration device message transferred according to the domain manager message, and may notify components of the first device. The registered components of the first device are deployed as components of an application program to process data stored in a storage media of the storage device such that a function of the storage device is dynamically extended.

20 Claims, 6 Drawing Sheets

(56) References Cited

OTHER PUBLICATIONS

T10 Technical Editor, "SCSI Object-Based Storage Device Commands-2 (OSD-2)," ISO/IEC 14776-392, ANSI INCITS, Jan. 2009.
A. Acharya, M. Uysal et al "Active disks: Programming model, algorithms and evaluation," Proceedings of the eighth international conference on Architectural support for programming languages and operating systems, 1998, p. 91.

Java Card 3: Classic Functionality Gets a Connectivity Boost (http://java.sun.com/developer/technicalArticles/javacard/javacard3/), Mar. 2009.
An Introduction to Java Card Technology—Part 1 (http://java.sun.com/javacard/reference/techart/javacard1/* SCA), May 29, 2003.
A. Raghuveer, S.W. Schlosser, and S. Iren, "Enabling database-aware storage with OSD," Mass Storage Systems and Technologies, Sep. 24, 2007, pp. 129-142.

* cited by examiner

STORAGE DEVICE TO EXTEND FUNCTIONS DYNAMICALLY AND OPERATING METHOD THEREOF

CROSS-REFERENCE TO RELATED APPLICATIONS

This application claims the benefits, under 35 U.S.C §119, of Korean Patent Application No. 10-2010-0132645 filed Dec. 22, 2010, the entirety of which is incorporated by reference herein.

BACKGROUND

1. Field of the General Inventive Concept

Exemplary embodiments relate to an electronic device, and more particularly, relate to a storage device.

2. Description of the Related Art

Storage devices such as hard disks may be connected to a host via interfaces, such as PATA, SATA, SCSI, SAS and the like. ATA/SCSI command sets may be defined on such interfaces to allow inter-communication between the storage device and the host. The ATA/SCSI command sets may be based on block-based commands in common. Command sets may provide commands for reading and writing data from and to storage device by the block (e.g., 512-byte).

As another storage device, a Solid State Drive (hereinafter, referred to as SSD) may be formed of a plurality of flash memory chips. The SSD performance may differentiate according to how data is arranged within flash memory chips. In case of a block-based interface, it is difficult to ascertain the hardware configuration within the SSD. That is, although the hardware configuration of the SSD is known, interfaces are limited to make use of the hardware configuration of the SSD. Further, since all SSDs have different hardware configurations from one another, it is difficult to practically optimize a file system of each SSD.

SUMMARY

In at least one exemplary embodiment of the present general inventive concept, a storage system comprises a first device including a device manager, and a storage device configured to form a domain with the first device and including a domain manager, wherein the domain manager sends a domain manager message to the first device in response to a discovery message transferred from the device manager and registers the first device in the domain based on a registration device message transferred according to the domain manager message and notifying components of the first device, and wherein the registered components of the first device are deployed as components of an application program to process data stored in a storage media of the storage device such that a function of the storage device is dynamically extended.

Additional features and utilities of the present general inventive concept will be set forth in part in the description which follows and, in part, will be obvious from the description, or may be learned by practice of the general inventive concept.

In at least one exemplary embodiment, when a discovery message is received from a second device having a device manager, the domain manager sends a domain manager message to the second device in response to a discovery message of the second device and register the second device in the domain based on a registration device message transferred according to the domain manager message and notifying components of the second device.

In another exemplary embodiment, when a link among components of the application program is broken, the domain manager un-registers a device including the broken component and reconfigures components of the application program based on components registered at the domain.

In yet another exemplary embodiment, the domain manager is configured to judge whether a network of the domain is broken.

In another exemplary embodiment, when the network of the domain is broken, the domain manager sends an alive request message to registered devices of the domain.

In another exemplary embodiment, when a response to the alive request message is not received from devices included in the domain within a predetermined time, the domain manager un-registers devices included in the domain and reconfigures components of the application program based on components registered in the domain.

In still another exemplary embodiment, the storage device includes a solid-state drive using flash memories as the storage media.

In another exemplary embodiment, the storage device communicates with the first device via one of a wire manner, a wireless manner, and a wire-wireless manner.

In yet another exemplary embodiment, the first device registered at the domain is a deploying target of the application program.

In still another exemplary embodiment, the domain manager is configured to perform install, start, stop, and remove operations on the application program according to a request of a user.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EXEMPLARY EMBODIMENTS

Figure 1:
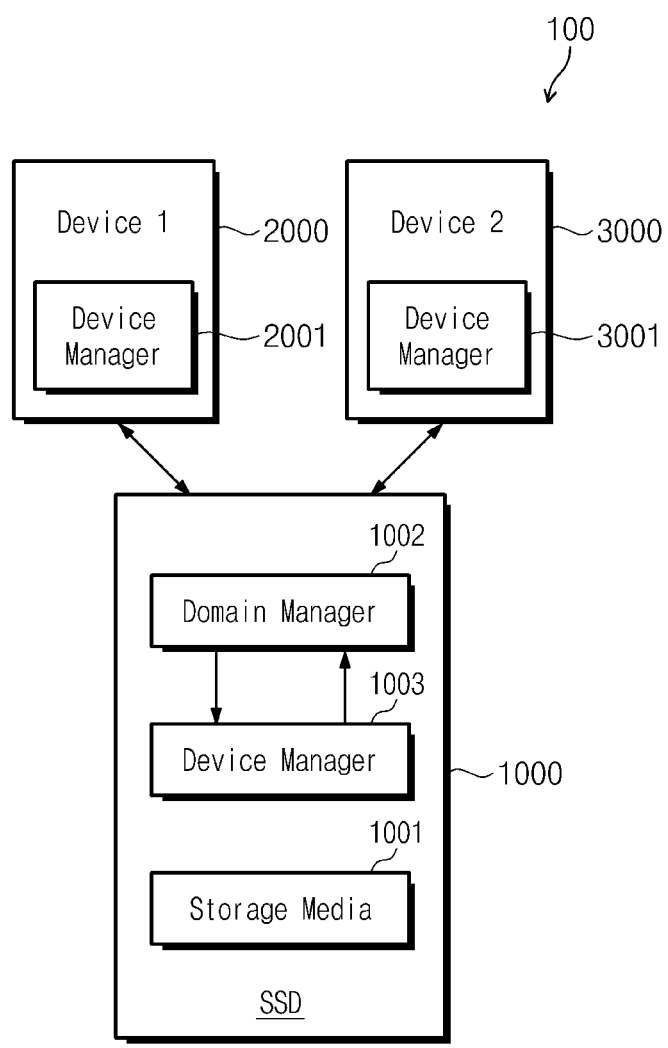
FIG. 1 is a diagram showing an operating environment using a storage device according to an exemplary embodiment of the inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The terminology used herein describes exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it may be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram showing an operating environment using a storage device according to an exemplary embodiment of the inventive concept.

Referring to FIG. 1, a storage system 100 comprises a storage device 1000 including a storage media 1001. The storage media 1001 may be formed, for example, of one or more flash memories. The storage media 1001 may store programs (e.g., middleware, virtual machine, native interface, FTL, OS, etc.) to operate the storage device 1000 and to configure the framework, programs (e.g., audio codec, video codec, network program, various interfaces, etc.) of various devices, data, and the like. Data stored in the storage media 1001 may be processed via one or more devices to be connected with the storage device 1000, as will be more fully described below. The storage device 1000 may be a Solid State Drive (SSD) supporting an Object-based Storage Device (OSD).

The storage device 1000 may include a domain manager 1002 and a device manager 1003. The domain manager 1002 and the device manager 1003 may be provided as modules including middleware. The domain manager 1002 may manage the storage device 1000 as one domain. The storage system 100 may include one or more devices 2000/3000 which electrically communicate with the storage device 1000 via communication interfaces. The communication interfaces may include, but are not limited wireless connections such as Wi-Fi, Ethernet and Bluetooth, and wired connection such as Small Computer System Interface (SCSI) and Serial Advanced Technology Attachment (SATA). The domain manager 1002 may generate a domain including one or more devices 2000/3000 connected to the storage device 1000, and may manage the domain which is included in the storage device 1000, and the devices connected therewith.

The device manager 1003 may manage one or more devices connected with the storage device 1000. In at least one exemplary embodiment, the device manager 1003 may determine one or more connected devices 2001/3001 registered in the domain generated by the domain manager 1002. Upon determining the connected devices, the device manager 1003 may communicate with device managers 2001/3001 of the connected devices 2000/3000, respectively, via the communication interface to share data stored in the storage media 1001, and may communicate with the device managers 2001/3001 to process the data using the connected devices 2000/3000, as discussed in greater detail below.

The storage device 1000 may be connected with various devices 2000 and 3000 in various manners including, but not limited to, a wired manner, a wireless manner, or a wire-wireless manner. The devices 2000 and 3000 may include existent electronic devices (e.g., computer, server, PDA, cellular phone, TV, etc.). The devices 2000 and 3000 connected with the storage device 1000 may include corresponding device managers 2001 and 3001, respectively. The device managers 2001 and 3001 of the devices 2000 and 3000 may manage the interconnection status with the domain manager 1002 of the storage device 1000, respectively. Each of the device managers 2001 and 3001 of the devices 2000 and 3000 may provide device information to the domain manager 1002 according to a request of the domain manager 1002 of the storage device 1000. For example, the device information may include information associated with application components (e.g., display component, audio component, play component, calculation component, etc.) included in each device 2000/3000.

The domain manager 1002 is a module included with the storage device 1000 and manages information associated with the source availability of operating environments of devices (or, systems) of the domain and each device, CPU, memory, etc. Each device (or, system) of the domain may be registered in the domain via discovery and registration processes which will be more fully described below. Java programming, the directory interface, the Remote Method Invocation (RMI) registry, etc. may be used, for example, to discover and/or register a device. A device (or, a system)

registered in the domain may become a deploying object of an application program, i.e., an application program that may use components of the device registered in the domain.

The storage device 1000 is configured to be movable and is not fixed to the devices 2000 and 3000. That is, the storage device may be attachably coupled to the storage device such that the storage device may attached/detached to/from the device 2000/3000. However, it is understood that the storage device 1000 may be configured to be fixed to the devices 2000 and 3000 included in the domain. This means that the storage device 1000 is configured to freely set the intercommunication with the devices 2000 and 3000. With the operating environment, it is possible to dynamically extend functions of the storage device 1000. In other words, functions of the storage device 1000 may be extended to various devices. For example, in the event that the storage device 1000 stores data to be displayed, the storage device 1000 may determine a display component of components of the devices 2000 and 3000 included in the domain. In response to detecting the display component, the storage device 1000 may transfer data to be displayed to a device having the determined display component. The device having the display component may process data transferred from the storage device 1000 so as to be displayed. If the storage device 1000 is disconnected from the device having the display component, the storage device 1000 may perform a display function using a display component provided by another device. It is well understood that dynamic function extension of the storage device 1000 is not limited to this disclosure. In other words, in deploying an application program, the domain manager 1002 deploys and connects application components via source availability/requirement, inputs of a user, and the like. A user may conduct install, start, stop, and remove operations of an application via the domain manager 1002. Each device (or, system) of the domain may be un-registered anytime. For example, each device (or, system) may automatically be un-registered via a user GUI by express. Alternatively, each device (or, system) may be un-registered via a domain manager by timeout of the device manager 2001/3001. This will be more fully described below.

Accordingly, it is possible to extend a function of the storage device 1000 by deploying components of devices dynamically. In other words, the storage device 1000 may leverage components of the connected devices 2000/3000 to expand the capability of the storage device 1000 beyond storage of data.

In an exemplary embodiment, the storage device 1000 and the devices 2000 and 3000 may constitute a storage system.

Figure 2:
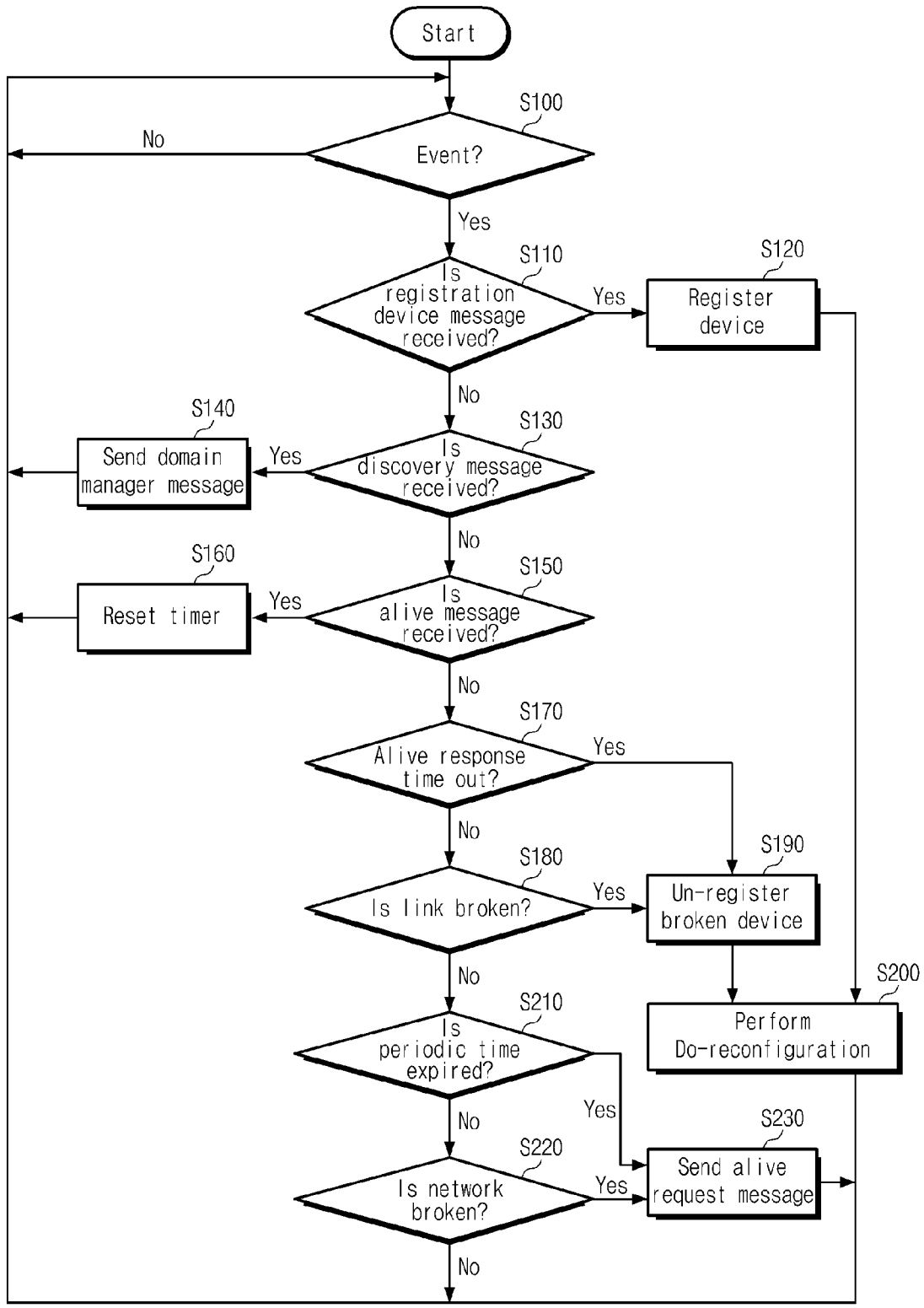
FIG. 2 is a flowchart showing an operation of a domain manager of a storage device in FIG. 1 according to an exemplary embodiment of the inventive concept.

FIG. 2 is a flowchart showing an operation of a domain manager of a storage device in FIG. 1 according to an exemplary embodiment of the inventive concept. Below, an operation of a domain manager of a storage device according to an exemplary embodiment of the inventive concept will be more fully described with reference to accompanying drawings. Prior to description, it is assumed that a storage device 1000 and devices 2000 and 3000 constitute a domain.

Referring to FIG. 2, in operation S100, a determination whether an event is generated. An event includes, but is not limited to, determining whether a storage device stores data to be reproduced. A reproduction of data includes, but is not limited to, image display and/or sound reproduction. Herein, the event may be various, as will be described below. If the event is not generated, the method returns to operation S100, and an operation of detecting the event may be repeated. If the event is generated, the devices 2000/3000 may generate registration device message indicating that the devices 2000/3000 are connected in the domain. In operation S110, a registration device message is received by the storage device 1000 from the devices 2000 and 3000 in the domain. The registration device message may include information representing components of the devices 2000 and 3000 connected with the storage device 1000. The components include, but are not limited to, a display unit to reproduce image data and/or audio system to reproduce audio data. Accordingly, the information may indicate the type of display unit and/or type of audio system of the devices 2000/3000. For example, the information may include, but is no limited to, display drivers, audio drivers, codecs, and web browser multimedia software applications. If the registration device message is received, the method proceeds to operation S120, in which the devices 2000 and 3000 providing the registration device message may be registered by a domain manager 1002 to be identifiable by the storage device 1000. After the registration of the devices 2000 and 3000, in operation S200, components of the connected devices 2000 and 3000 may be reconfigured. With the component reconfiguration, it is possible to utilize components of devices as a component of the storage device 10000 and it is possible to process data stored in the storage device 1000 via components of the devices 2000 and 3000 included in the domain. Afterward, the method proceeds to operation S100.

Returning to operation S110, if the registration device message is not received, in operation S130, there is determined whether a discovery message is received from the devices 2000 and 3000 of the domain. Herein, the discovery message, as will be described below, is provided from each of device managers 2001 and 3001 in the devices 2000 and 3000 of the domain and is a message to search the domain manager 1002 which exists in the domain. If the discovery message is received, the method proceeds to operation S140, in which the domain manager 1002 of the storage device 1000 sends a domain manager message to the devices 2000 and 3000 providing the discovery message. Afterwards, the method proceeds to operation S100. On the other hand, if the discovery message is not received, the method proceeds to operation S150.

In operation S150, there is determined whether an alive message is received. The alive message, as will be described below, is a message to notify whether a device in the domain is operating, e.g., powered on, and is sent from a device included in the domain. More specifically, an alive requesting message is sent to one or more devices, and a timer is started. The timer counts down a response time period over which the alive message may be received. If the alive message is received during the response time period, it may be determined that the device 2000/3000 is operating properly, and the method proceeds to operation S160, where the timer is reset. Afterwards, the method proceeds to operation S100. If the alive message is not received before the timer times out, the method proceeds to operation S170, in which there is determined whether an alive response is received from devices of the domain within a given time. More specifically, if the alive response is not received during the response time period, the method proceeds to operation S190. If the alive response is received during the response time period, the method proceeds to operation S180 to further diagnose the connection between the devices 2000/3000 and the storage device 1000. In operation S180, there is determined whether a link among deployed components is broken. Herein, the deployed components may constitute one application. If the link is broken, the method proceeds to operation S190, in which devices having broken components are un-registered. Afterwards, the method proceeds to operation S200, in which components of connected devices 2000 and 3000 may be reconfigured. Afterwards, the method proceeds to operation S100.

If the link is not broken, the method proceeds to operation S210, to determine whether a periodic time is expired. If the periodic time is expired, the method proceeds to operation S230. If the periodic time is not expired, the method proceeds to operation S220, in which the domain manager 1002 of the storage device 1000 judges whether a network is broken. If the network is not broken, the method proceeds to operation S100. If the network is broken, the method proceeds to operation S230. When the periodic time is expired or the network is broken, in operation S230, the domain manager 1002 of the storage device 1000 may send the alive request message to the devices 2000 and 3000 in the domain. When the alive request message is sent to the devices 2000 and 3000 in the domain, there is set the timer to judge whether the alive response is received within the given time. Afterwards, the method proceeds to operation S100.

The above-described operations may be made via the domain manager 1002 of the storage device 1000. The domain including the storage device 1000 and one or more devices may be configured by the domain manager 1002, and the storage device 1000 and one or more devices constituting the domain may be connected or disconnected automatically via the domain manager 1002. Accordingly, a function of the storage device may be dynamically extended via the domain manager 1002 of the storage device 1000.

In an exemplary embodiment, it is well understood that the order of event judging operations described in FIG. 2 may be determined differently from this disclosure.

Figure 3:
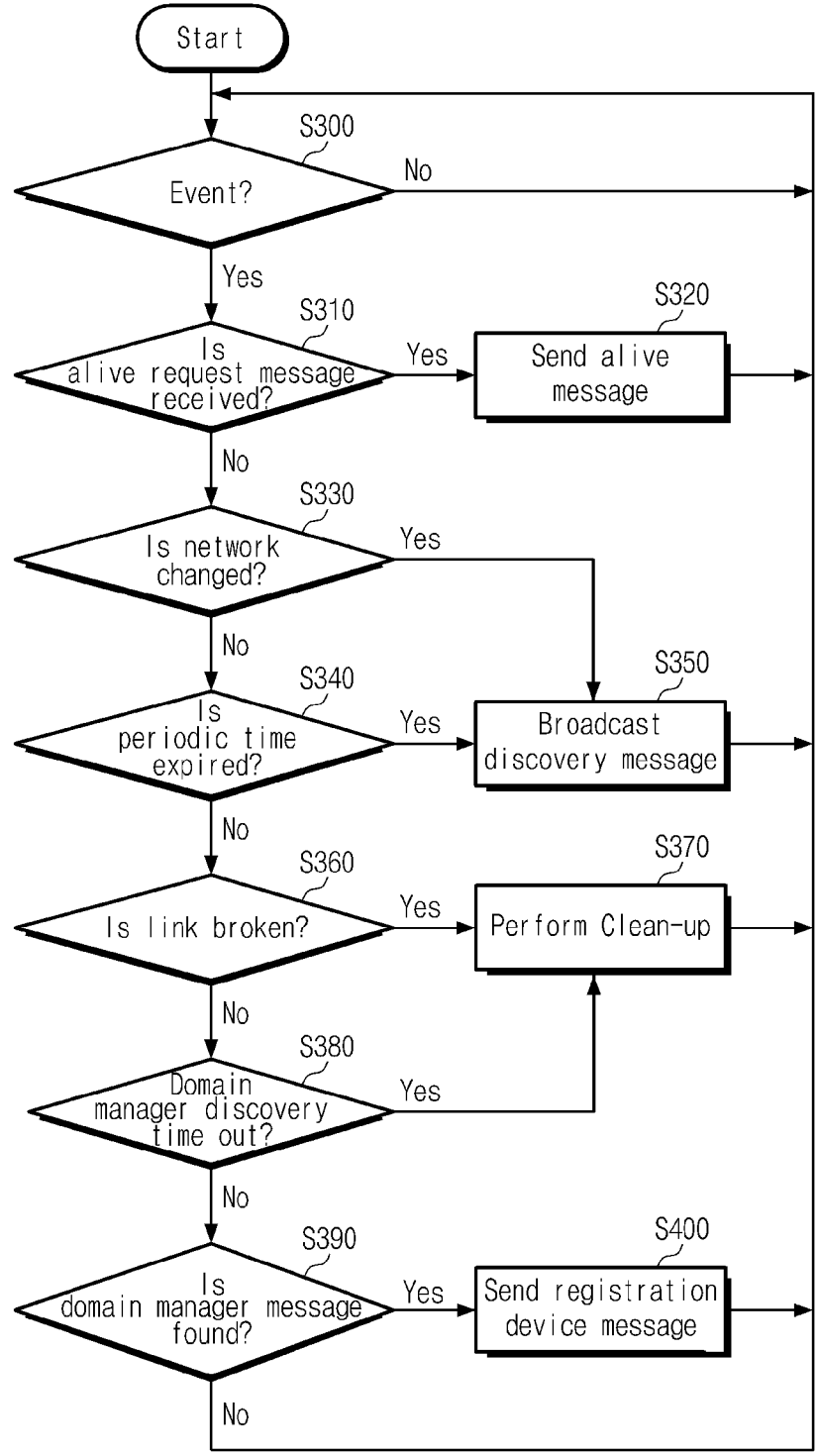
FIG. 3 is a flowchart showing an operation of a device manager according to an exemplary embodiment of the inventive concept.

FIG. 3 is a flowchart showing an operation of a device manager according to an exemplary embodiment of the inventive concept. Below, an operation of a device manager according to an exemplary embodiment of the inventive concept will be more fully described with reference to accompanying drawings.

Referring to operation S300, it is determined whether an event is generated. If no event is generated, the event detecting operation may be repeated. On the other hand, if the event is generated, the method proceeds to operation S310, in which there is determined whether an alive request message is received. The alive request message may be provided from a domain manager 1002 of a storage device 1000 in operation S190 of FIG. 2. If the alive request message is received, the method proceeds to operation S320. In operation S320, an alive message may be sent to the domain manager 1002 of the storage device 1000. Afterwards, the method proceeds to operation S300.

If the alive request message is not received, the method proceeds to operation S330, in which there is determined whether a network is changed. Herein, a network change may include a wire to wireless change, a wireless to wire change, a change of an IP address, and the like. If the network is changed, the method proceeds to operation S350. If no network is changed, the method proceeds to operation S340. In operation S340, there is determined whether a periodic time is expired. If the periodic time is expired, the method proceeds to operation S350. When no network is changed or the periodic time is ended, in operation S350, a discovery message may be sent. The discovery message may be used as a message to detect the domain manager 1002. Afterwards, the method proceeds to operation S300.

Returning to operation S340, if no periodic time expired, the method proceeds to operation S360, in which a link among components constituting an application is broken. If the link is broken, the method proceeds to operation S370. If no link is broken, the method proceeds to operation S380. In operation S380, there is determined whether a domain manager 1002 is not discovered within a given time. If the domain manager 1002 is not discovered within the given time, the method proceeds to operation S370, in which operations associated with the storage device 1000 may be cleaned up. For example, in a case programs associated with such operations are downloaded from the storage device 1000, the downloaded programs may be removed. Afterwards, the method proceeds to operation S300.

If the domain manager 1002 is discovered within the given time, the method proceeds to operation S390, in which there is determined whether a domain manager message is received. If the domain manager message is not received, the method proceeds to operation S300. If the domain manager message is received, the method proceeds to operation S400, in which a device manager 1003 may send a registration message to the domain manager 1002 of the storage device 1000. As set forth above, the registration device message 1003 may include information representing components of a device 2000/3000 included in a domain. Afterwards, the method proceeds to operation S300.

In an exemplary embodiment, it is well understood that the order of event judging operations described in FIG. 3 is determined to be different from this disclosure.

Figure 4:
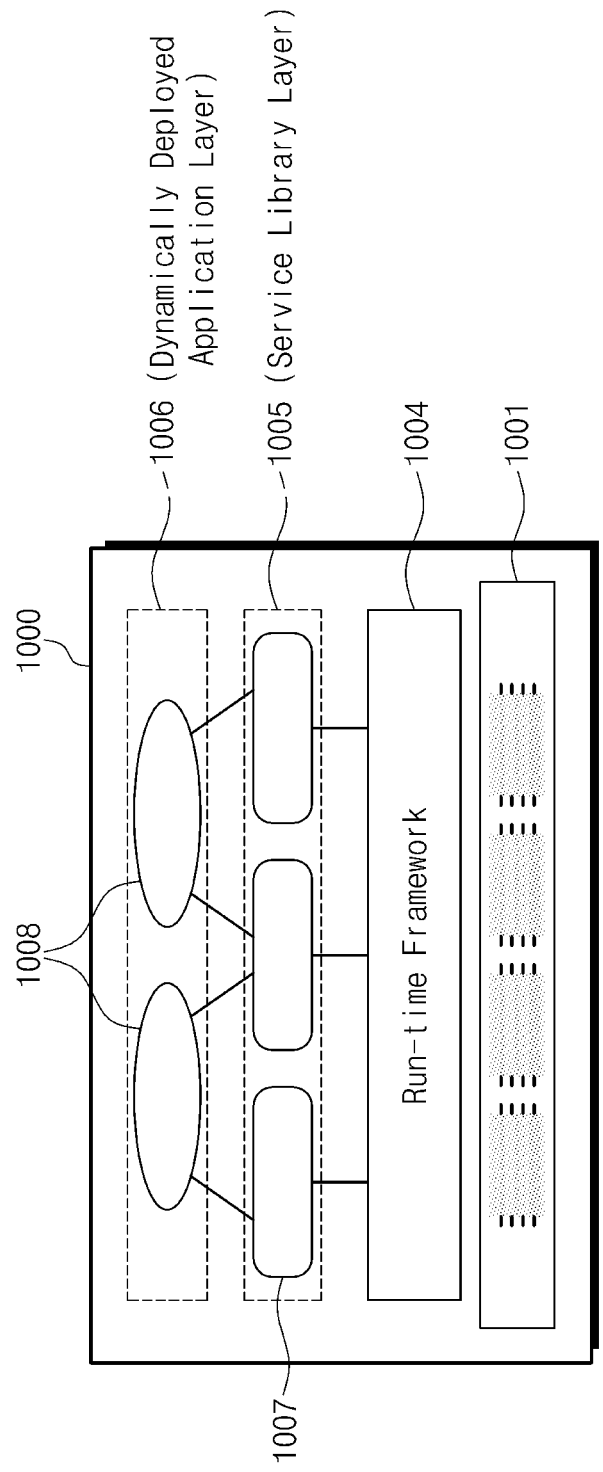
FIG. 4 is a block diagram showing a storage device in FIG. 1 according to an exemplary embodiment of the inventive concept.

FIG. 4 is a block diagram showing a storage device in FIG. 1 according to an exemplary embodiment of the inventive concept.

Referring to FIG. 4, a storage device 1000 may include a storage media 1001 to store data. The storage media 1001 may be formed of flash memories. The storage device 1000 may include one or more layers. For example, FIG. 4 illustrates the storage device 1000 include three layers. The three layers include, but are not limited to, a run-time framework layer 1004, a service library component layer 1005, and a dynamically deployed application layer 1006. The run-time framework layer 1004 among the layers 1004, 1005, and 1006 may represent an operating environment where dynamically deployed application modules (or, components) operate, and may include an operating system (OS), a virtual machine, flash translation layer (FTL), and the like, as discussed further below. The service library component layer 1005 may represent a layer that operates service libraries 1007 used in common by an application program, similar to a library. The application layer 1006 may represent a layer where dynamically deployed program modules and/or applications (i.e., components) 1008 operate. For example, the application layer 1006 may be dynamically updated with application components 1008 to process data stored in the storage medium based on the operation of the domain manager 1002 and the registration of devices 2000/3000 connected to the storage device 1000, as discussed above.

Figure 5:
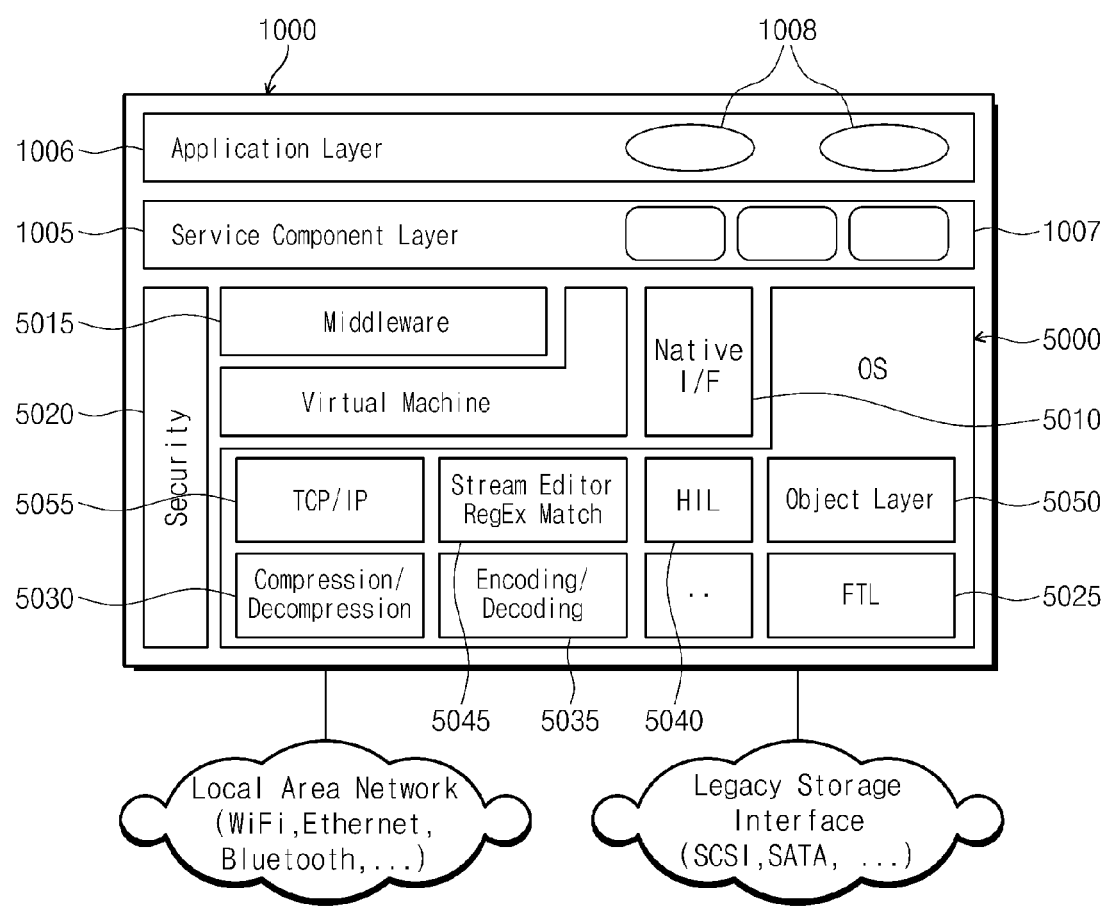
FIG. 5 is a diagram showing a run-time framework layer in FIG. 4.

FIG. 5 is a diagram showing a run-time framework layer 1004 of a storage device 1000 illustrated in FIG. 4.

Referring to FIG. 5, a run-time framework layer 1004 may include an operating system (OS) module 5000, a virtual machine module 5005, a native interface module 5010, a middleware module 5015, and a security module 5020. The OS module 5000, generally indicated, may include one or more modules that process data to be utilized by the components of the connected devices 2000/3000, i.e., a display and/or sound system, as discussed in greater detail below. The OS module 5000 may also include a device driver which provides the standardized and structured access on the hardware and the kernel charging the scheduling and memory management. The kernel may include a conventional ordinary/non-ordinary RTOS (Real-Time Operating System).

The flash memory and the hardware accelerator may be separate modules, or may be integrated together. In a case where the flash memory and the hardware accelerator are integrated, a device driver, such as a flash translation layer (FTL) module 5025 may include software to access the flash memory and the hardware accelerator. The hardware accelerator capable of being mounted at a solid state drive (SSD) may include a compressor/decompressor module 5030 associated with a compression function, an encoder/decoder module 5035 associated with an encoding function, a hardware module (HIL) 5040 to search the regular expression, a stream editor module 5045 having a function of exchanging/handling a data stream according to a given rule, an object layer module 5050, and the like. The OS module may further include a communication module 5055, such as a TCP/IP module and/or a Bluetooth protocol stack module to communicate via Wi-Fi, the Ethernet, the Bluetooth, and the like. The storage device 1000 may also communicate with externally connected storage devices via legacy storage interfaces including, but not limited to, Small Computer System Interface (SCSI), and Serial Advanced Technology Attachment (SATA).

The virtual machine (VM) module 5005 may include the Dalvik VM, etc. It is possible use a byte code used by virtual machine (e.g., JVM, Dalvik VM, etc.) as a code format of an application program, which operates at the storage device 1000, e.g., SSD, according to an exemplary embodiment of the inventive concept. For example, if the standardized virtual machine is used, a separate code need not be made for every SSD, and various services and libraries provided by the virtual machine may be utilized. Further, the virtual machine is may increase security of data stored in the storage device 1000.

The native interface module 5010 is a module of directly using a function of the OS module 5000 at an application program code which operates at the SSD. As set forth above, if the virtual machine module 5005 is used, the performance may be lowered as compared with the code which operates on a target processor directly. In order to overcome such problem, the native interface module 5005 is provided to make the code directly operate on the target processor.

The middleware module 5015 may be based on various software to control an application program and a service component of the storage device 1000. For example, functions including, but not limited to, downloading of the application program and the service component, installing of the application program and the service component, linking of the application program and the service component, life cycle managing of the application program and the service component, and the like may be controlled by the middleware module 5015. The middleware module 5015 may further control functions of starting and/or stopping the execution and of setting various parameters.

Figure 6:
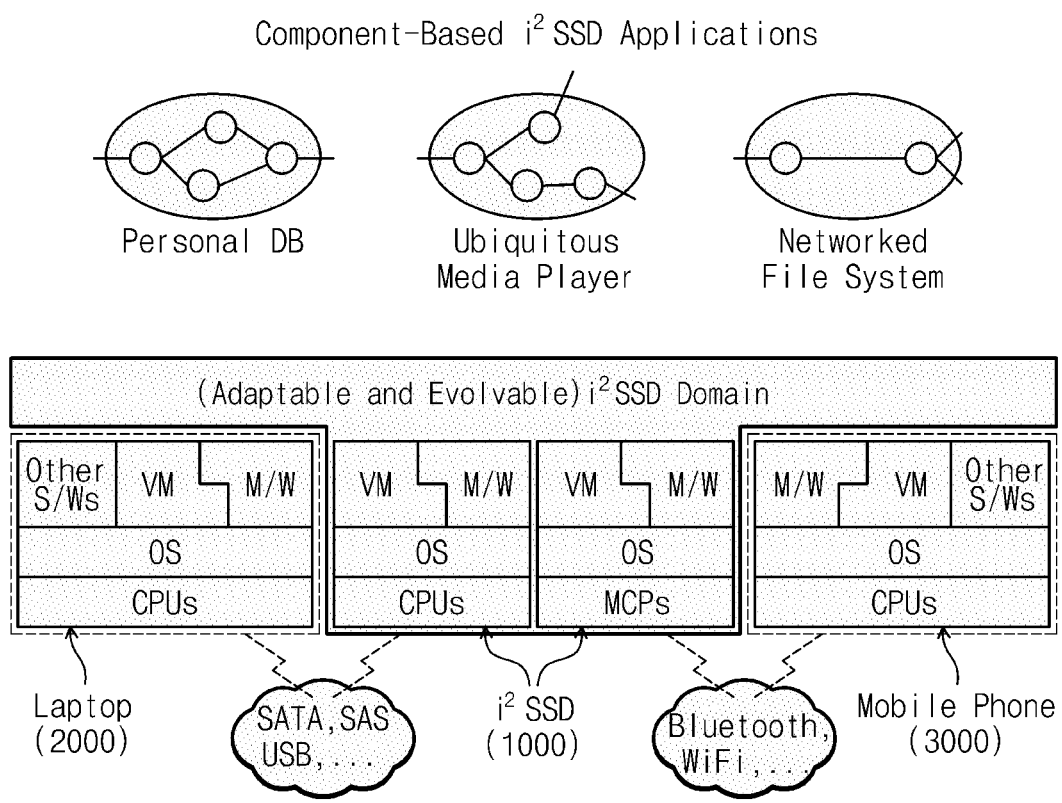
FIG. 6 is a diagram showing a domain according to an exemplary embodiment of the inventive concept.

FIG. 6 is a diagram showing a domain according to an exemplary embodiment of the present general inventive concept.

Referring to FIG. 6, an operating area of a storage device 1000 according to an exemplary embodiment may be extended to devices (e.g., a laptop computer and a mobile phone) included in a domain determined by the domain manager 1002 of the storage device 1000. The storage device 1000 and the laptop computer 2000, for example, may be connected via a network channel such as SATA, SAS, USB, and the like, which may be managed by the domain manager 1002, as described in detail above. Further, the storage device 1000 and a mobile phone 3000, for example, may be connected via a network channel such as Bluetooth, Wi-Fi, and the like, which may also be managed by the domain manager 1002, as described above. As illustrated in FIG. 6, an application program is provided by one or more components which communicate via interconnections. The connection relationship among application components, that is, the application program structure may be expressed via XML and the like. Devices (or, systems) of the laptop computer 2000 and/or mobile phone 3000 registered in a domain may be included or removed in or from the domain dynamically whenever a user keeping the storage device 1000 relocates.

With exemplary embodiments of the present general inventive concept, it is possible to dynamically extend a function of a storage device beyond storing data by providing the standardized operating environment capable of operating at a target storage device regardless of the hardware component by a module of an application program. Accordingly, an application program vender can directly realize the storage optimized to own application program regardless of a storage vendor. Further, it is possible to create a storage application program market where an optimized module of an application program is offered for sale, i.e., marketed.

Although not illustrated in figures, a domain manager may be provided in each device. In this case, each device and a storage device may manage a domain independently, and a domain managing operation may be executed to be identical to that described above.

In at least one exemplary embodiment, a module of an application program executed at a device of a domain may be installed at a storage device 1000. In this case, a module installed at the storage device 1000 may process stored data according to a request of a device and may provide a processed result to the device, which may further be utilized by the components, e.g., the display and/or audio system, of the device.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A storage system comprising:
   a first device including a device manager and one or more components; and
   a storage device configured to generate a domain with the first device and including a domain manager,
   wherein the domain manager sends a domain manager message to the first device in response to a discovery message transferred from the device manager and registers the first device in the domain based on a registration device message which is transferred from the device manager according to the domain manager message and which identifies at least one component of the first device,
   wherein the at least one identified component of the registered first device is deployed as a component of an application program to process data stored in a storage media of the storage device such that a function of the storage device is dynamically extended.

2. The storage system of claim 1, wherein when a discovery message is received from a second device having a device manager, the domain manager sends a domain manager message to the second device in response to a discovery message of the second device and registers the second device in the domain based on a registration device message transferred according to the domain manager message and identifying components of the second device.

3. The storage system of claim 2, wherein when a link among components of the application program is broken, the domain manager un-registers a device including the broken component and reconfigures components of the application program based on components registered at the domain.

4. The storage system of claim 2, wherein the domain manager is configured to determine whether a network of the domain is broken.

5. The storage system of claim 4, wherein when the network of the domain is broken, the domain manager sends an alive request message to registered devices of the domain.

6. The storage system of claim 5, wherein when a response to the alive request message is not received from devices included in the domain within a predetermined time, the domain manager un-registers devices included in the domain and reconfigures components of the application program based on components registered in the domain.

7. The storage system of claim 1, wherein the storage device includes a solid state drive using flash memories as the storage media.

8. The storage system of claim 1, wherein the storage device communicates with the first device via at least one of a wire manner, a wireless manner, and a wire-wireless manner.

9. The storage system of claim 1, wherein the first device registered at the domain is a deploying target of the application program.

10. The storage system of claim 1, wherein the domain manager is configured to perform install, start, stop, and remove operations on the application program according to a request of a user.

11. A storage device to electrically communicate with an external device having one or more components, comprising:
a storage media to store data;
a communication interface to electrically communicate the data with the external device; and
a domain manager to determine at least one component of the one or more components of external device based on a discovery signal output by the external device and to generate a domain including the at least one component in response to a message from the external device identifying the at least one component.

12. The storage device of claim 11, wherein the domain manager deploys the identified at least one component as a component of an application program to process data stored in the storage media such that a function of the storage device is dynamically extended.

13. The storage device of claim 11, further comprising a device manager to communicate with the domain to determine the external device and to communicate with the external device via the communication interface and to control the at least one component of the external device.

14. The storage device of claim 13, wherein the device manager communicates with the storage media and the domain manager and outputs data to the external device in response to identifying the at least one component, and controls the external device to process the data using the at least one component.

15. The storage device of claim 11, wherein the communication interface includes at least one of a wired communication interface and a wireless communication interface.

16. The storage device of claim 11, wherein the storage media comprises:
a data storage module to store the data; and
at least one application module to process the data based on the identified at least one component of the external device.

17. A device to electrically communicate with a storage device, comprising:
at least one external component to process data; and
a device manager to control the at least one external component and to electrically communicate with the storage device that stores a component of an application program, the device manager to output a registration signal identifying the at least one external component and to receive data from the storage device in response to the registration signal identifying the at least one external component by the storage device,
wherein the device manager controls the at least one external component to process the data from the storage device.

18. The device of claim 17, wherein the device manager deploys the identified at least one external component of the first device as a component of an application program to process data stored in a storage media of the storage device such that a function of the storage device is dynamically extended 19. The device of claim 17, wherein the external component is at least one of a display unit and an audio system.

20. A storage system, comprising:
a first device having at least one component to process at least one of image data and audio data;
a storage device in electrical communication with the first device, the storage device comprising:
a storage medium to store data;
an operating module including an operating system to run at least one application program; and
a domain manager module to generate a network domain including a registered component of the first device in response to detecting a connection between the first device and the storage device,
wherein the registered component of the first device is deployed in the storage medium of the storage device as a component of an application program, and the operating module communicates with the component of the application program deployed in the storage medium and the first device to process data stored in the storage medium.

* * * * *